US006633768B2

(12) United States Patent
Hurme et al.

(10) Patent No.: US 6,633,768 B2
(45) Date of Patent: Oct. 14, 2003

(54) RESTRICTION OF COMMUNICATION DURATION IN A TELECOMMUNICATIONS NETWORK

(75) Inventors: Jaana Hurme, Tampere (FI); Soili Haapala, Espoo (FI); Tomi Lindgren, Vantaa (FI); Markus Martin, Helsinki (FI); Raili Numminen, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/879,566

(22) Filed: Jun. 12, 2001

(65) Prior Publication Data

US 2002/0019227 A1 Feb. 14, 2002

Related U.S. Application Data

(63) Continuation of application No. PCT/FI99/01041, filed on Dec. 15, 1999.

(30) Foreign Application Priority Data

Dec. 23, 1998 (FI) .................................................. 982797

(51) Int. Cl.[7] .............................. H04B 1/38; H04M 1/00
(52) U.S. Cl. ..................... 455/565; 455/560; 455/410; 455/406; 455/407; 455/412; 455/433; 379/115.14; 379/115.15
(58) Field of Search ............................... 455/410, 412, 455/433, 406, 407, 560, 565; 379/114.14, 115.01, 114.15

(56) References Cited

U.S. PATENT DOCUMENTS

| 5,867,566 | A | | 2/1999 | Hogan et al. | |
|---|---|---|---|---|---|
| 5,875,236 | A | * | 2/1999 | Jankowitz et al. | 379/111 |
| 5,907,602 | A | | 5/1999 | Peel et al. | |
| 5,995,823 | A | * | 11/1999 | Stephens | 455/410 |
| 6,131,045 | A | * | 10/2000 | Iwata | 340/7.39 |
| 6,163,695 | A | * | 12/2000 | Takemura | 455/422 |
| 6,185,416 | B1 | * | 2/2001 | Rudokas et al. | 379/114.14 |
| 6,335,971 | B1 | * | 1/2002 | Springer et al. | 379/144.01 |
| 6,377,938 | B1 | * | 4/2002 | Block et al. | 379/114.03 |
| 6,381,316 | B2 | * | 4/2002 | Joyce et al. | 379/112.01 |
| 6,385,446 | B2 | * | 5/2002 | Palviainen et al. | 455/417 |
| 6,404,865 | B1 | * | 6/2002 | Springer et al. | 379/114.14 |
| 6,404,871 | B1 | * | 6/2002 | Springer et al. | 379/144.01 |

FOREIGN PATENT DOCUMENTS

| EP | 0746135 A3 | 12/1996 |
|---|---|---|
| GB | 2307618 A | 5/1997 |
| WO | WO 98/44716 | 10/1998 |

OTHER PUBLICATIONS

Michel Mouly and Marie–Bernadette Pautet; "The GSM System for Mobile Communications", Palaiseau, France, 1992.
International Search Report for PCT/FI99/01041.

* cited by examiner

Primary Examiner—Vivian Chin
Assistant Examiner—Marceau Milord
(74) Attorney, Agent, or Firm—Squire, Sanders & Dempsey L.L.P.

(57) ABSTRACT

The invention relates to a method and an arrangement for restricting the duration of communication in a telecommunications network. The invention is based on the idea that at least one restriction table is created with restriction parameters for monitoring the duration of sub-scriber's communication on the basis of the call type and the applicability of this restriction table to individual subscribers is indicated by a status parameter in subscriber specific data. Based on the call type, such as a forwarded or mobile originated call, the correct restriction parameter is retrieved from the restriction table for those subscribers for whom the status parameter is set "on" and the limiting value included in the restriction parameter is used in detecting and indicating calls of long duration. In one embodiment of the invention the restriction parameters are created to apply on the basis of call type and call direction.

12 Claims, 3 Drawing Sheets

RESTRICTION OF COMMUNICATION DURATION IN A TELECOMMUNICATIONS NETWORK

This is a continuation of Application No. PCT/FI99/01041, filed Dec. 15, 1999.

FIELD OF THE INVENTION

The invention relates to a method and an arrangement for communication duration restriction in a telecommunications network, especially in a mobile communications network.

BACKGROUND OF THE INVENTION

Modern telecommunications networks offer a subscriber several supplementary services in directing a call. Call Forwarding (CF) is a supplementary service which permits a called subscriber to have the network route all incoming calls to a preset number. Call Transfer (CT) is another supplementary service which permits a subscriber to transfer an established incoming or outgoing call to a third party. Such supplementary services pose the threat of fraud, making use of telecommunication services without the intent to pay. Mobile communications networks are especially exposed to fraudulent use. Typically, a fraudulent user applies for a subscription with false identity and with no intention to pay any telephone bills. The most common types of fraud are related to the ability to sell calls, such as forwarded or transferred calls. In such cases, the fraudulent user programs the desired telephone number as the forwarded-to number for the fraudulent subscription, after which the caller pays only for a local call, for example. Without good control large unpaid bills could be produced by calling expensive destinations such as Premium Rate or international numbers. It is very much in the interests of the network operators to detect this misuse and stop it at the earliest possible opportunity.

FIG. 1 of the attached drawing shows a simplified block diagram of the GSM mobile communications system. The mobile station MS is connected via a radio path to a base transceiver station BTS, in FIG. 1, to the base station BTS1. A base station sub-system BSS consists of a base station controller BSC and the base stations BTS controlled by it. A mobile services switching center MSC usually controls several base station controllers BSC and is connected to other mobile services switching centers and a GMSC (Gateway Mobile Services Switching Center). Via the GMSC the GSM network is connected to other networks, such as the PSTN (Public Service Telephone Network), another mobile communication network PLMN, the ISDN network, the intelligent network IN, or the short message service center SMSC. The operation of the entire GSM system is monitored by the operation and maintenance center OMC. Subscriber information of the mobile station MS is stored permanently in the Home Location Register HLR and temporarily in the Visitor Location Register VLR of the area in which the mobile station MS is currently located. Subscriber information contains information on all the services the subscriber is entitled to and the subscriber's present location. The information as to the location of the mobile station MS is stored in the visitor location register VLR with the accuracy of a Location Area LA.

One method for preventing large unpaid bills is to limit the duration of the calls. In some networks, switching center specific parameters limiting the duration of the calls are used. These limiting parameters are common for all the subscribers and for all types of calls. Therefore, within one MSC all the calls are limited to one hour, for example. When the time limit is reached, the call is released or some other network element specific action is performed, such as giving a report to the operator.

The problem with known fraud prevention methods is that the duration of calls can be restricted only by a default value which is either used for all the calls of all the subscribers or for none. It is not possible to define limiting values on a subscriber basis. Yet the operator has varying needs to monitor the possible fraudulent use of different subscribers. On the other hand, there is the problem of the long duration of certain types of calls, especially to certain destinations.

SUMMARY OF THE INVENTION

The object of this invention is to implement effective and flexible prevention of fraudulent use in a telecommunications network on a subscriber basis.

This is achieved through a method and an arrangement according to the invention characterized by what is stated in the independent claims. Special embodiments of the invention are presented in the dependent claims.

The invention is based on the idea that at least one restriction table is created with restriction parameters for monitoring the duration of subscriber's communication on the basis of the call type and the applicability of this restriction table to individual subscribers is indicated by a status parameter in subscriber specific data. Based on the call type, such as a forwarded or mobile originated call, the correct restriction parameter is retrieved from the restriction table for those subscribers for whom the status parameter is set "on" and the limiting value included in the restriction parameter is used in detecting and indicating calls of long duration. In one embodiment of the invention the restriction parameters are created to apply on the basis of call type and call direction.

The advantage of the method according to the invention is that the network operator is able to restrict the duration of calls on a call type base. Additionally, restriction can be directed to the subscribers individually. The system provides tools for the operator to monitor and limit the duration of the subscriber's calls, including transferred and forwarded calls.

Another advantage of the method according to the invention is that the management of the restriction parameters is simple.

The advantage of the arrangement according to the invention is that the subscriber data file is not enlarged to any great extent, but rather only with individual restriction status at the most.

BRIEF DESCRIPTION OF THE DRAWINGS

The preferred embodiments of the invention will now be described with reference to the attached drawings, in which.

DETAILED DESCRIPTION OF THE INVENTION

Figure 1:
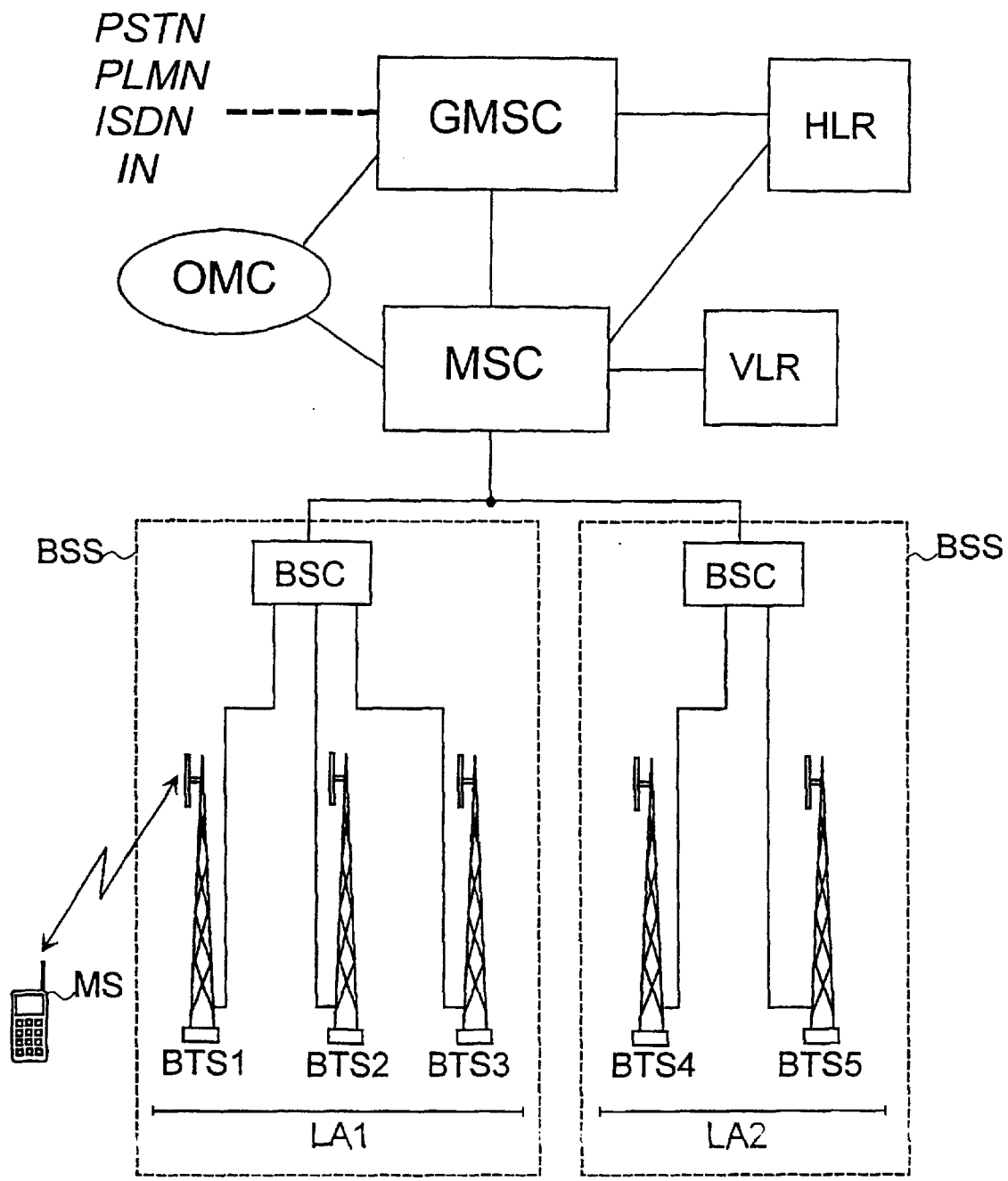
FIG. 1 shows the parts of the mobile communication network that are essential for the invention.

The present invention can be applied to any telecommunications network. The invention will be described below in more detail mostly by using the digital mobile communications system GSM as an example. FIG. 1 shows the simplified structure of a GSM network as described earlier. The GSM system is described in GSM specifications and the book: "The GSM System for Mobile Communications", M. Mouly & M. Pautet, Palaiseau, France, 1992, ISBN:2-9507190-0-7, where an interested reader can find more background information.

Figures 2, 4:
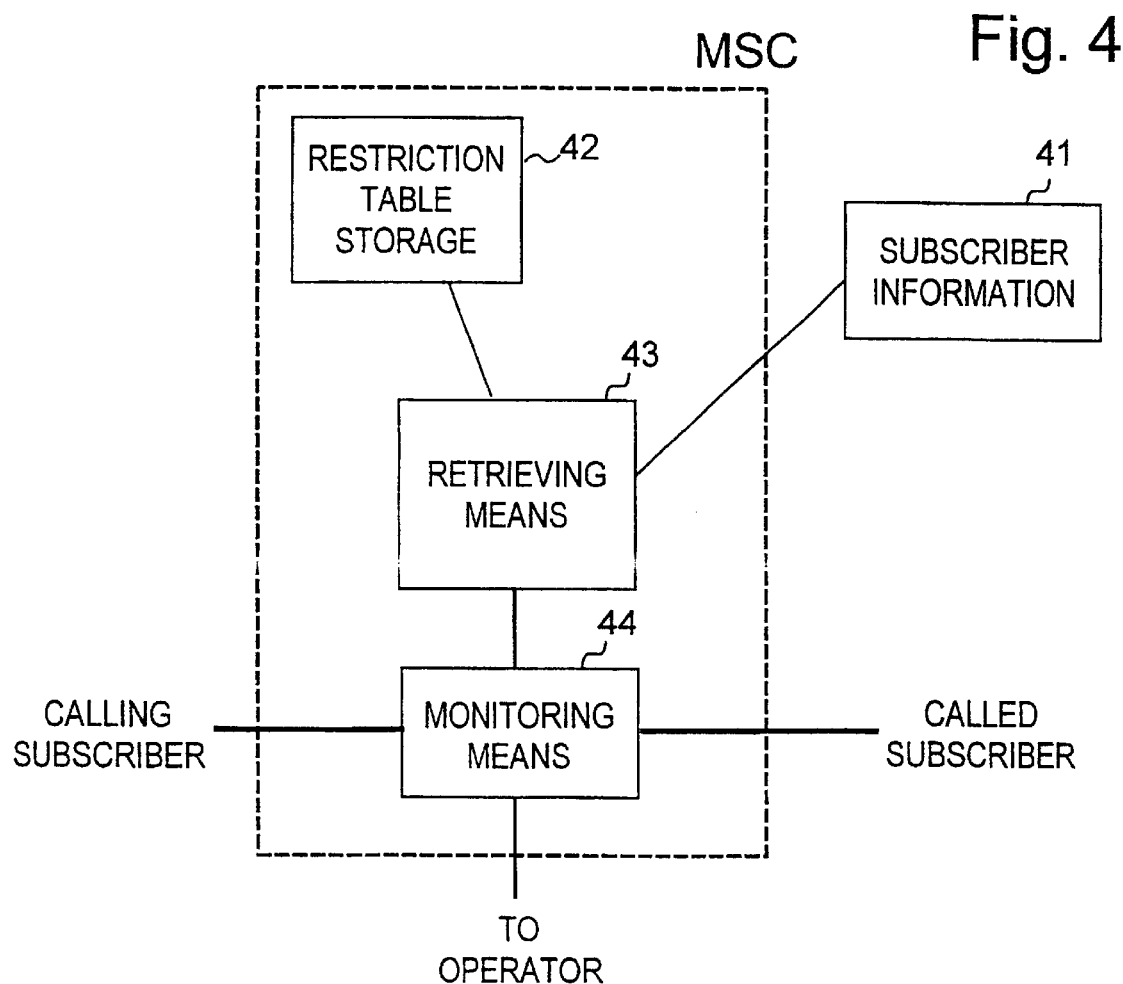
FIG. 2 shows an example of the structure of a restriction table according to the invention.
FIG. 4 shows an arrangement according to the invention as a block diagram.

FIG. 2 shows an example of the restriction table according to the invention. The first index in the horizontal lines of the table relates to the call type, and the second index in the vertical columns of the table relates to the call direction. In the example in FIG. 2, the call types are the mobile originating call MO, call transfer CT, call forwarding CF, the data call DATA, and all calls ALL. The columns in the figure represent different called countries COUNTRY1–4, etc. For example, when a subscriber to whom the restriction table is to be applied performs call transfer to Country3, the call duration is restricted to 20 minutes, after which the call is released. The call direction division can also be other than the country codes presented in FIG. 2. Other examples of call direction division are division by zones, routing directions, and/or division into national and international calls. The call direction divisions can be combined, but then a priority has to be established between different divisional grounds.

In the restriction table, the limiting value gives the maximum time a call can last and an optional action parameter defines the action that is to be carried out after the limit is reached. The action taken when the limiting value is encountered can as well be the network element specific action according to prior art. When the restriction table is being created, the limiting value can be set to be any suitable time period and the action parameter to be any suitable action, such as giving a report to the network operator, giving an alarm to the network operator, and/or terminating the call. The actions other than terminating the call are transparent to the subscriber.

Figure 3:
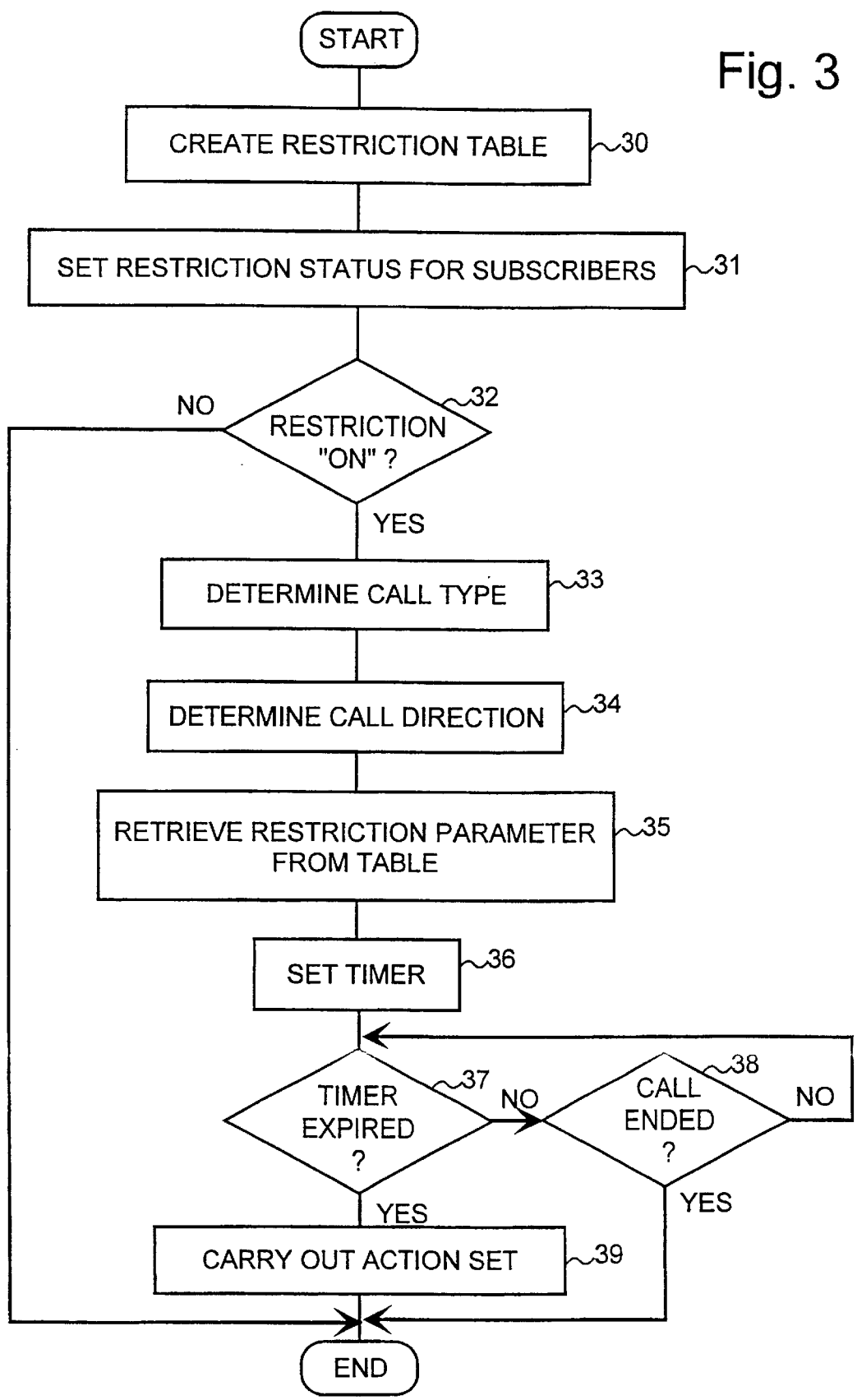
FIG. 3 shows the first embodiment of the method according to the invention as a flow chart.

The first embodiment of the invention is shown as a flow chart in FIG. 3. At stage 30, the network operator or some other authority creates at least one restriction table. The table can be network specific, network element specific, such as MSC specific, or even subscriber specific. The table can be stored in the network element, such as in association with the switching center MSC or the visitor location register VLR, or in a database, such as the home location register HLR. At stage 31 the restriction status is set "on" for at least some subscribers. Preferably, the status is set in the subscriber information in the home location register HLR or in other relevant subscriber specific data. If the restriction status is stored in the HLR, it is transferred from the HLR via the MAP interface to the VLR when the subscriber is roaming. It is advantageous to set the restriction status either "on" or "off" for every subscriber. Stages 30 and 31 need only be carried out once in the network and not separately for each call. Later on, the restriction status of individual subscribers can-be modified when such need arises. At the beginning of a call, the element controlling the call checks if the restriction status is set "on" for the subscriber (stage 32). If the restriction status in subscriber data is "off" or it is not set, the handling of the call is continued according to prior art. When the restriction status is "on", the method according to the invention is continued at stage 33. Next, the element controlling the call determines the call type (stage 33) and call direction (stage 34). Based on these indexes the restriction parameter is retrieved from the restriction table (stage 35). The restriction parameter includes a time limit and possibly an action parameter. The restriction parameter is to be applied for the call in question. Preferably, the encounter with the time limit is monitored by a timer or a counter. At stage 36 a timer is set which then starts monitoring the duration of the call. At stage 37 a check is made as to whether the timer is expired, which means that the time limit retrieved has been encountered. If not, a check is made as to whether the call has ended (stage 38). If not, monitoring is continued at stage 37. The monitoring is terminated when the call ends before the time limit set for the duration of the call has been reached. When the timer is expired, an action according to the restriction parameter or a network element specific action is carried out (stage 39).

In another embodiment of the invention, the call restriction can be based solely on the call type, such as a mobile originating call, call transfer, call forwarding, or a data call. The restriction parameter is set for different call types in a one-dimensional restriction table, and the relevant time limit is retrieved for different types of calls from the restriction table when the call duration restriction is applicable for the subscriber, i.e. when the restriction status in the subscriber data is "on". If there are several time limits for one call, e.g. when the service control point SCP limits the duration, the subscriber specific time limit is given by the restriction table, and when a network element specific time limit exists, the shortest time limit can be chosen.

FIG. 4 shows an example of a structure of the arrangement according to the invention. The arrangement includes subscriber information 41 according to prior art. According to the invention the arrangement includes a storage 42 with a restriction table file, retrieving means 43 for retrieving the correct restriction parameter from the restriction table, and monitoring means 44 for monitoring the subscriber's communication from the calling subscriber to the called subscriber according to the invention. The monitoring means 44 determine the call characteristics used as indexes in the restriction table, such as the all type and possibly the call direction. These characteristics are transferred to the retrieving means 43, which retrieve from the restriction table the time limit and any action parameter relating to the characteristics provided. These restriction parameters retrieved are transferred to the monitoring means 44 which monitor the duration of the call based on the time limit retrieved. Upon encounter with the time limit, the action defined by the action parameter or a network element specific action is taken. The output of the monitoring means 44 can be provided to the operator of the network. The storage 42 can be located in the switching center MSC, the visitor location register VLR, the home location register HLR, or any other relevant network element. The retrieving means 43 and the monitoring means 44 can be located in association with the switching center MSC as shown in FIG. 4.

The drawings and the related description are only intended to demonstrate the principles of the invention. Although the invention is described above mainly in terms of a GSM network, it may also be used with other telecommunications networks, such as the Wireless Local Area Network WLAN. The details of the method according to the invention can vary within the patent claims. In this application the term "call" refers also to communication other than speech call, such as data calls. As described above, each subscriber's data preferably includes reference to whether the values in the restriction table are used for the subscriber or not, but the invention can also be implemented only partially. For example, fraud prevention can be carried out according to prior art using network element specific default values when the restriction table is not in use in some network elements, or the limitation can be implemented on a subscriber basis according to the invention for home subscribers and based on common default values for roamers. Also other base for division than those described above can be used when creating the restriction table according to the invention. Alternatively, the restriction table and also other functionality of the invention can be implemented in the intelligent network IN.

What is claimed is:

1. A method for restricting the duration of a communication in a telecommunications network, the method comprising:

storing subscriber information in a first database;

creating at least one restriction table in a second database, the second database including restriction parameters for monitoring a duration of a subscriber's communication based upon a call type;

setting a duration restriction in use for some subscribers through a status parameter in the first database; and performing the following when the duration restriction has been set in use for a subscriber;

retrieving from the restriction table a restriction parameter relevant for the communication in question, wherein the restriction table is included within a switching center of the telecommunications network;

monitoring in the switching center the duration of the communication based on the restriction parameter retrieved; and indicating an encounter with the restriction parameter.

2. The method according to claim 1, further comprising restricting the duration of the subscriber's communication based on the call type and a call direction indication a destination of a call, in response to restriction parameters in the restriction table.

3. The method according to claim 1, wherein the restriction parameters include at least one action parameter relating to a specific limiting value and an encounter with the specific limiting value is indicated with an action according to the at least one action parameter.

4. The method according to claim 1, further comprising restricting communication of a subscriber upon an encounter of the restriction parameter.

5. The method according to claim 1, further comprising giving a report to the network on the encounter with the restriction parameter.

6. The method according to claim 1, further comprising giving an alarm to the network on the encounter with the restriction parameter.

7. The method according to claim 1, further comprising indicating to an operator of the network the encounter with the restriction parameter.

8. An arrangement for restricting a duration of a communication in a telecommunications network, the arrangement comprising:

a first database for storing subscriber information;

means for monitoring a duration of a subscriber's communication;

a second database including at least one restriction table with restriction parameters for monitoring a duration of the subsciber's communications based on a call type;

a status parameter in the first database indicating whether a duration restriction is used for a subscriber;

at least one switching center comprising:

means for retrieving from the at least one restriction table a restriction parameter relevant for a communication in question; and means for monitoring and indicating an encounter with the restriction parameter.

9. The arrangement according to claim 8, wherein the restriction table includes restriction parameters for monitoring the duration of the subscriber's communication based on the call type and a call direction indicating a destination of a cell.

10. The arrangement according to claim 8, wherein restriction parameters include time limits for the duration of the communication.

11. The arrangement according to claim 8, wherein the restriction parameters include time limits for the duration of the communication and action parameters relation to specific time limits and defining an action to be taken on an encounter with a time limit.

12. The arrangement according to claim 8, wherein means for monitoring the duration of the subscriber's communication and the means for monitoring and indicating the encounter are located in association with a switching center.

* * * * *